Patented Dec. 23, 1952

2,622,996

UNITED STATES PATENT OFFICE 2,622,996

TREATMENT OF HEAVY MATERIALS COMPRISING KERATINOUS FIBERS

Oscar P. Cohen, Brighton, Mass., assignor to Monsanto Chemical Company, St. Louis, Mo., a corporation of Delaware No Drawing. Application November 28, 1947,
Serial No. 788,659

9 Claims. (Cl. 117—141)

The present invention relates to improvements in the art of preparing resin-impregnated felt, blankets and other heavy materials fabricated in whole or in part from keratinous fibers and to the products so produced.

It is known to treat textile materials fabricated from keratinous fibers with various types of thermosetting resins so as to reduce the tendency of such materials to shrink, to impart thereto an enhanced resistance to water adsorption and the like. While such treatments have been successful when applied to wearing apparel fabrics they have not been satisfactory heretofore when applied to felts, blankets and other similar heavy materials fabricated from keratinous fibers due to an objectionable decrease in resilience, and a decidedly increased stiffness. In accordance with the present invention, however, resin-impregnated felts, blankets and other heavy materials fabricated from keratinous fibers are provided which are not only improved in wet and dry strength, resistance to shrinkage, water adsorption, staining and the like but additionally have substantially the same resilience and stiffness as a felt or blanket that has not been resin treated.

Accordingly, it is one object of the invention to provide methods for preparing resin-impregnated felts, blankets and other heavy materials fabricated from keratinous fibers while substantially retaining the natural resilience and stiffness thereof.

A further object of the invention is to provide resin-impregnated felts, blankets and other heavy materials fabricated from keratinous fibers characterized by improved wet and dry strength, resistance to shrinkage, water adsorption and a substantially natural resilience and stiffness.

Still further objects and advantages of the invention will appear from the following description and the appended claims.

The types of materials which can be treated in accordance with the invention are fabricated wholly or in part from keratinous fibers. However, the invention is particularly directed to the treatment of such heavy materials as papermaker's felts, printing felts, blankets and the like, comprising from 80 to 100% of such keratinous fibers as sheep and lamb wool, mohair and other animal fibers characterized by the ability to felt and by a molecular structure which includes disulfide linkages and/or cystine structural units. The term "heavy materials" as employed herein is intended to mean materials characterized by a weight of at least 14 oz. per yard length and 60 inch width.

In carrying out the invention such materials are suitably impregnated wtih a liquid composition comprising a suitable solvent or dispersing agent such as water, ethanol or mixtures thereof and the like; a thermosetting resin as, for example, melamine-aldehyde resins; a soluble or finely dispersible aliphatic mercapto polyhydric alcohol such as 2-mercapto-ethanol; and then subjecting the resin-impregnated material to a curing operation either with or without the accelerating action of a catalytic agent. If desired, suitable adjuvants, for example, catalysts, wetting agents and the like may also be added to the liquid composition. The impregnating composition preferably comprises water as a solvent or dispersing medium together with water-soluble or finely-dispersible thermosetting resins, water-soluble or finely-dispersible aliphatic mercapto polyhydric alcohols and such adjuvants as are desired and which are compatible with the other ingredients.

As examples of thermosetting resins which are employable herein are such amino-aldehyde resins as urea-aldehyde resins, thiourea-aldehyde resins, dicyandiamide-aldehyde resins, guanidine-aldehyde resins and the like or the alkylated derivatives of such resins and amino-s-triazine-aldehyde resins as, for example, melamine-aldehyde resins, urea and/or thiourea modified melamine-aldehyde resins, alkylated melamine-aldehyde resins, urea or thiourea modified alkylated melamine-aldehyde resins, halogenated melamine-aldehyde resins, halogenated alkylated melamine-aldehyde resins and the like. Phenol-aldeyde resins are also employable herein. The invention particularly is directed to the employ of melamine-formaldehyde resins, chlorinated melamine-formaldehyde resins, methylated melamine-formaldehyde resins and chlorinated methylated melamine-formaldehyde resins.

Such resins are preferably prepared by reacting a suitable amino compound such as urea, melamine and the like or such a compound as phenol with an aldehyde, preferably formaldehyde, and stopping the reaction while the resin or condensation product is still water soluble or water dispersible. These resins or condensation products with the exception of phenol-formaldehyde resins can be alkylated, if desired, in any suitable manner as, for example by reacting them with alcohols such as ethanol, methanol and the like and stopping such reaction while the product is still water soluble or water dispersible. Moreover, either of these types of resins with the exception of phenolic resins may be halogenated by reaction in a suitable liquid medium with chlorine or bromine or with compounds containing active halogen as, for example, chloramine T and the like.

The mercapto polyhydric alcohols as employed herein are preferably either water soluble or at least finely dispersible in an aqueous medium. Moreover, such mercapto alcohols are preferably compatible with the above described resins in an aqueous medium in the sense that they will not precipitate the resin from solution. As examples of mercapto polyhydric alcohols which are employable herein may be mentioned 2-mercapto-ethanol, 1-thiosorbitol, 1-thioglycerol and the like.

A further understanding of the invention will be obtained from the following examples which are intended to be illustrative, but not limitative of the scope of the invention, parts and percentages being by weight unless otherwise specified.

Example I

A low polymeric amino-aldehyde resin (hereinafter referred to as resin G) is prepared by reacting 4 mols of formaldehyde in the form of a 37% neutral aqueous solution with 1 mol of melamine at a pH of about 9.3, the mixture is maintained at a temperature of approximately 80° C. during the reaction, and as soon as it becomes clear the solution is spray dried while the temperature is maintained at approximately 80° C. An amorphous solid having extreme water solubility is obtained.

A solution is prepared by stirring the following ingredients:

10 parts of resin G (as prepared above)
90 parts of water
3% by volume of 2-mercapto-ethanol based on the volume of the above solution
1 part of 2-amino-2-methyl-propanol phosphate (prepared by neutralizing 2-amino-2-methyl-propanol with phosphoric acid)

A strip of industrial felt is thoroughly wetted out in the above solution and centrifuged until 6.4% resin solids based on the weight of dry felt is retained. The felt is then dried and subjected to a temperature of 300° F. for a period of about 15 minutes so as to cure the resin. The treated sample possesses substantially the same resilience and stiffness as an untreated sample. Moreover, it shows improved wet and dry strength, resistance to water adsorption and staining as compared to a control sample.

An identical strip of industrial felt is treated in the same manner as described above except that 2-mercapto-ethanol is not added to the resin solution. The treated sample is stiff and shows a decided loss of resilience.

Samples of the above felts and an untreated sample of the same felt each two inches long and one and a half inches wide are conditioned for at least 12 hours at a relative humidity of about 65% and a temperature of approximately 70° F. and then tested for stiffness on a Gurley R. D. stiffness tester of the type described in the patent to Ralph A. Masters No. 2,092,809 in accordance with the procedure described therein. The results of this test were as follows, in which the relative stiffness is measured by the number of milligrams (load) required to bend or deflect the sample.

| Treatment | Stiffness |
| --- | --- |
| | $Mg.$ |
| Control—no resin | 144.3 |
| 6.4% Resin G deposited | 466.3 |
| 6.4% Resin G+3% by volume of 2-mercapto-ethanol | 177.6 |

Example II

A solution is prepared by stirring the following ingredients:

13 parts of Resin G (as prepared in Example 1)
187 parts of water
1 part of 2-amino-2-methyl-propanol phosphate (prepared by neutralizing 2-amino-2-methyl-propanol with phosphoric acid)
3% by volume of 2-mercapto-ethanol based on the volume of the above solution A strip of all wool blanket is padded through the above solution so as to deposit 11% resin solids based on the weight of the dry blanket material. The blanket material is then subjected to a temperature of 325° F. for 10 minutes so as to dry the material and cure the resin deposited thereon. The treated sample possessed a resilience and stiffness which was substantially the same as a control sample.

An identical strip of wool blanket was treated in the same manner as described above except that 2-mercapto-ethanol was not added to the resin solution. The treated sample is stiff and shows a decided loss of resilience.

Samples of the blanket materials as obtained above and a control sample each two inches long and one and a half inches wide are conditioned and tested for stiffness as described in Example I. The following table shows the results of this test.

| Treatment | Stiffness |
| --- | --- |
| | $Mg.$ |
| Control—no resin | 84.4 |
| 11% Resin G deposited | 183.5 |
| 11% Resin G+3% by volume of 2-mercapto-ethanol | 122.3 |

Example III

A low polymeric thermosetting resin (hereinafter referred to as resin H) is prepared by reacting 1 mol of melamine with 5 mols of formaldehyde in the form of a 37% neutral aqueous solution at a temperature of about 100° C. until solution occurs. The resin is separated from the above solution by cooling and is then recovered by filtration and dried. This resin is alkylated by reaction with 14 mols of methyl alcohol under refluxing conditions in the presence of about 0.1 mol of hydrochloric acid. The reaction is allowed to proceed until solution occurs whereupon said solution is then neutralized with caustic soda to the phenolphthalein endpoint. This solution is concentrated by evaporation to a 60% resin solids content. The solution is in the form of a viscous liquid capable of extreme dilution with water and/or alcohol.

A solution comprising a chlorinated methylated melamine-formaldehyde resin is prepared by stirring the following ingredients for about 12 minutes at a temperature of approximately 75° F.

12 parts of resin H (60% resin solids as prepared above)
80 parts of water
0.6 part of chloramine T 1.0 part of 2-amino-2-methyl-propanol phosphate (prepared by neutralizing 2-amino-2-methyl propanol with phosphoric acid)

To the above solution is added with stirring 3% by volume of 2-mercapto-ethanol based on the volume of the above solution.

A strip of industrial felt is thoroughly wetted out in the above solution and is centrifuged so as to retain 4.4% resin solids based on the dry weight of the felt. The sample is then dried and the resin cured in situ thereon by heating to a temperature of 300° F. for 15 minutes.

An identical strip of industrial felt is treated in exactly the same manner except that the 2-mercapto-ethanol is not added to the resin solution.

A control sample and two samples of felt as treated above each two inches long and one and a half inches wide are conditioned and tested in the same manner as described in Example I. The following table shows the results of this test:

| Treatment | Stiffness |
| --- | --- |
| Control—no resin | 144.3 |
| 4.4% chlorinated methylated melamine resin | 621.6 |
| 4.4% chlorinated methylated melamine resin + 2-mercapto-ethanol | 272.4 |

*Example IV*

A solution was prepared by stirring the following ingredients:

12 parts of resin H (60% resin solids as prepared in Example III)
88 parts of water
3 parts of 1-thiosorbitol A sample of industrial felt is thoroughly wetted out in the above solution and is centrifuged until 4.4% resin solids is retained based on the dry weight of felt. The felt is then dried and the resin cured thereon by heating same to a temperature of 325° F. for 20 minutes.

The sample so treated has a resilience which is only slightly decreased as compared to a control sample, but is additionally characterized by an improved wet and dry strength, water resistance and stain resistance. Moreover, the treated felt is not detrimentally stiffened as compared to the control.

*Example V*

A solution is prepared by stirring the following ingredients:

100 parts of an aqueous solution comprising 10% of water-soluble phenol-formaldehyde condensation product
3 parts of 1-thiosorbitol
1 part of zinc chloride A sample of industrial felt is thoroughly wetted out in the above solution and is then hydro-extracted until 4% resin solids is retained by the felt. The sample is then heated to a temperature of 325° F. for 15 minutes to cure the resin incorporated thereon.

The treated sample has an improved wet and dry strength, resistance to water adsorption and staining and is only slightly less resilient and not appreciably stiffened as compared to a control sample.

The liquid compositions as employed herein are preferably employed at room temperatures as, for example, from 65 to 85° F. although slightly increased temperatures may be desirable in certain types of applications depending upon the type of finish desired. The time period during which the materials may be immersed for treatment may be varied considerably, but need only be of such duration as to thoroughly wet out the material. This is of considerable advantage for commercial operations.

Any suitable method may be used for wetting out the materials in the liquid compositions as employed herein as, for example, simple immersion, spraying and the like. When excess solution is removed so as to control the amount of resin and mercapto polyhydric alcohol deposited, it may be accomplished in any convenient manner such as by padding, hand wringing, hydro-extraction or the like.

It is preferred to deposit from 2 to 10% resin by weight based on the weight of the material treated when carrying out the treatment of felts and other similar heavy materials in accordance with the invention. The amount of mercapto polyhydric alcohol deposited is preferably from 15 to 50% based on the weight of resin deposited and depending also on its water solubility or dispersibility.

Although the examples show that the materials treated herein have been subjected to temperatures of from 300 to 325° F. for purposes of drying the material and curing the resin incorporated thereon other drying and curing temperatures may be used depending upon the length of curing and drying time desired and whether or not a curing catalyst is employed. Curing and drying temperatures ranging from 225 to 350° F. are preferred. The curing time may also be varied considerably, but a curing period of from 10 to 60 minutes is generally desirable. The term "cure" as employed herein is intended to mean an operation during which the thermosetting resin, or resins, is polymerized and rendered substantially water insoluble.

What is claimed is:

1. The method of finishing a felt comprising keratinous fibers with a resin and preserving substantially unaltered the natural resilience and stiffness of said felt which comprises wetting out said material in an aqueous medium comprising a thermosetting resin selected from the group consisting of water-soluble and water-dispersible amino-aldehyde and phenol-aldehyde thermosetting resins and an aliphatic mercapto compound selected from the group consisting of 2-mercapto-ethanol and water-soluble and water-dispersible aliphatic mercapto polyhydric alcohols, immediately thereafter removing the material from said aqueous medium, extracting the material to remove excess solution therefrom and subjecting said treated material to an elevated temperature to cure the resin incorporated in and on the fibers thereof.

2. The method of finishing a felt comprising keratinous fibers with a resin and preserving substantially unaltered the natural resilience and stiffness of said felt which comprises wetting out said material in an aqueous medium comprising a thermosetting resin selected from the group consisting of water-soluble and water-dispersible amino-aldehyde and phenol-aldehyde thermosetting resins and 1-thio-sorbitol, immediately thereafter removing the material from said aqueous medium, extracting the material to remove excess solution therefrom and subjecting the material to an elevated temperature to cure the resin incorporated in and on the fibers thereof.

3. The method of finishing a felt comprising keratinous fibers with a resin and preserving substantially unaltered the natural resilience and stiffness of said felt which comprises wetting out said material in an aqueous solution comprising a water-soluble amino-s-triazine-aldehyde resin and an aliphatic mercapto compound selected from the group consisting of 2-mercapto-ethanol, and water-soluble and water-dispersible aliphatic mercapto polyhydric alcohol, immediately thereafter removing the material from said solution extracting the material to remove excess solution therefrom and subjecting the material to an elevated temperature to cure the resin incorporated in and on the fibers thereof.

4. A method of finishing a felt comprising keratinous fibers with a resin and preserving substanatially unchanged the natural resilience and stiffness of said felt which comprises wetting out said material in an aqueous solution comprising a water-soluble phenol-formaldehyde resin and an aliphatic mercapto compound selected from the group consisting of 2-mercapto-ethanol, and water-soluble and water-dispersible aliphatic mercapto polyhydric alcohols, immediately thereafter removing the material from said solution, extracting the material to remove excess solution therefrom and subjecting the material to an elevated temperature to cure the resin incorporated in and on the fibers thereof.

5. The method of finishing a felt comprising keratinous fibers with a resin and preserving substantially unchanged the natural resilience and stiffness of said felt which comprises wetting out said material in an aqueous solution comprising a water-soluble melamine-formaldehyde resin and 2-mercapto-ethanol, immediately thereafter removing the material from the solution, extracting the material to remove excess solution therefrom, the concentration of the solution and the degree of extraction being so adjusted as to deposit in and on the material from about 2 to 10% by weight of said resin based on said material and from about 10 to 50% by weight of said 2-mercapto-ethanol based on said resin, and subjecting said material to an elevated temperature to cure said resin.

6. The method of finishing a felt comprising keratinous fibers with a resin and preserving substantially unchanged the natural resilience and stiffness of said felt which comprises wetting out said material in an aqueous solution comprising a water-soluble methylated melamine-formaldehyde resin and 2-mercapto-ethanol, immediately thereafter removing the material from said solution, extracting the material to remove excess solution therefrom, the concentration of the solution and degree of extraction being so adjusted as to deposit in and on the material from about 2 to 10% by weight of said resin based on said material and from about 10 to 50% by weight of said 2-mercapto-ethanol based on said resin, and subjecting the material to an elevated temperature to cure said resin.

7. The method of finishing a felt comprising keratinous fibers with a resin and preserving substantially unchanged the natural resilience and stiffness of said felt which comprises wetting out said material in an aqueous solution of a water-soluble chlorinated melamine-formaldehyde resin and 2-mercapto ethanol, immediately thereafter removing the material from said solution, extracting the material to remove excess solution therefrom, the concentration of the solution and degree of extraction being so adjusted as to deposit in and on the material from about 2 to 10% by weight of said resin based on the material and from about 10 to 50% by weight of said 2-mercapto-ethanol based on said resin; and subjecting the material to an elevated temperature to cure said resin.

8. The method of finishing a felt comprising keratinous fibers with a resin and preserving substantially unchanged the natural resilience and stiffness of said felt which comprises wetting out said material in an aqueous solution comprising a water-soluble chlorinated methylated melamine-formaldehyde resin and 2-mercapto-ethanol, immediately thereafter removing the material from said aqueous solution, extracting the material to remove excess solution therefrom, the concentration of the solution and degree of extraction being so adjusted as to deposit in and on the material from about 2 to 10% by weight of said resin based on said material and from about 10 to 50% by weight of said 2-mercapto-ethanol based on said resin, and subjecting said material to an elevated temperature to cure said resin.

9. A shrink-resistant felt comprising keratinous fibers and containing a water-insoluble resin, said felt having been wetted out in an aqueous medium comprising a thermosetting resin selected from the group consisting of water-soluble and water-dispersible amino-aldehyde and phenol-aldehyde thermosetting resins and an aliphatic mercapto compound selected from the group consisting of 2-mercapto-ethanol, and water-soluble and water-dispersible aliphatic mercapto polyhydric alcohols and immediately thereafter removed from the solution and then subjected to an elevated temperature to cure the resin, said felt being characterized by a substantially natural resilience and stiffness.

OSCAR P. COHEN.

REFERENCES CITED

The following references are of record in the file of this patent:

UNITED STATES PATENTS

| Number | Name | Date |
|---|---|---|
| 2,191,362 | Widmer et al. | Feb. 20, 1940 |
| 2,238,672 | Arthur et al. | Apr. 15, 1941 |
| 2,240,388 | Calva | Apr. 29, 1941 |
| 2,329,622 | Johnstone et al. | Sept. 14, 1943 |
| 2,329,651 | Powers et al. | Sept. 14, 1943 |

FOREIGN PATENTS

| Number | Country | Date |
|---|---|---|
| 117,071 | Australia | June 3, 1943 |